(12) United States Patent
Dover (10) Patent No.: US 10,176,328 B2
(45) Date of Patent: Jan. 8, 2019

(54) SELF-MEASURING NONVOLATILE MEMORY DEVICE SYSTEMS AND METHODS

(71) Applicant: Micron Technology, Inc., Boise, ID (US)

(72) Inventor: Lance Walker Dover, Citrus Heights, CA (US)

(73) Assignee: Micron Technology, Inc., Boise, ID (US)

( * ) Notice: Subject to any disclaimer, the term of this patent is extended or adjusted under 35 U.S.C. 154(b) by 167 days.

(21) Appl. No.: 15/401,929

(22) Filed: Jan. 9, 2017

(65) Prior Publication Data

US 2017/0124332 A1    May 4, 2017

Related U.S. Application Data

(63) Continuation of application No. 14/549,418, filed on Nov. 20, 2014, now Pat. No. 9,569,622.

(51) Int. Cl.
| | |
|---|---|
| *G06F 11/00* | (2006.01) |
| *G06F 21/57* | (2013.01) |
| *H04L 9/32* | (2006.01) |
| *G06F 9/4401* | (2018.01) |

(52) U.S. Cl.
CPC .......... *G06F 21/575* (2013.01); *G06F 9/4406* (2013.01); *H04L 9/3236* (2013.01); *H04L 9/3247* (2013.01); *G06F 2221/034* (2013.01)

(58) Field of Classification Search
CPC .... G06F 11/1417; G06F 11/22; G06F 21/575; G06F 2221/034; H04L 9/3236; H04L 9/3247

See application file for complete search history.

(56) References Cited

U.S. PATENT DOCUMENTS

| | | | |
|---|---|---|---|
| 5,475,839 A | 12/1995 | Watson | |
| 6,122,733 A | 9/2000 | Christeson | |
| 6,560,703 B1 | 5/2003 | Goodman | |
| 8,479,292 B1 | 7/2013 | Linhardt | |
| 9,594,638 B2 * | 3/2017 | Potlapally | ........... G06F 11/1417 |
| 9,823,972 B2 * | 11/2017 | Yu | ........................ G06F 11/1666 |
| 9,836,606 B2 * | 12/2017 | Tabone | ............... G06F 11/1417 |

(Continued)

OTHER PUBLICATIONS

Jedec Committee Letter Ballot; Jun. 1, 2009; p. 21-23.

*Primary Examiner* — Joshua P Lottich (74) *Attorney, Agent, or Firm* — Fletcher Yoder, P.C.

(57) ABSTRACT

One embodiment describes a computing system that includes a boot device. The boot device includes nonvolatile memory that stores startup routine instructions and a first pointer, in which the first pointer identifies a first one or more memory addresses in the nonvolatile memory where at least a portion of the startup routine instructions are stored, and a microcontroller that retrieves the startup routine instructions from the nonvolatile memory using the first pointer and determines whether the startup routine instructions are corrupted before executing any portion of the startup routine instructions. The computing system further includes a central processor communicatively coupled to the boot device, in which the central processor executes the startup routine instructions to initialize the computing system when the microcontroller determines that the startup routine instructions are not corrupted.

6 Claims, 4 Drawing Sheets

(56) References Cited

U.S. PATENT DOCUMENTS

| | | | |
|---|---|---|---|
| 9,898,368 B1* | 2/2018 | Hendricks | G06F 21/554 |
| 2006/0020845 A1 | 1/2006 | Broyles | |
| 2009/0327367 A1 | 12/2009 | Mehra | |
| 2015/0019793 A1 | 1/2015 | Dover | |
| 2016/0117225 A1 | 4/2016 | Yu | |

* cited by examiner

SELF-MEASURING NONVOLATILE MEMORY DEVICE SYSTEMS AND METHODS

CROSS-REFERENCE TO RELATED APPLICATIONS

Under 35 U.S.C. § 120, this application is a continuation of U.S. patent application Ser. No. 14/549,418, entitled "SELF-MEASURING NONVOLATILE MEMORY DEVICE SYSTEMS AND METHODS" and filed on Nov. 20, 2014, which is incorporated by reference herein in its entirety for all purposes.

BACKGROUND

Field of the Invention

The present disclosure relates generally to nonvolatile memory devices, and particularly, to self-measuring nonvolatile memory devices, for example using programmable pointers.

Description of the Related Art

Generally, when a computing system is powered on, the computing system executes a startup routine to initialize the computing system. Often, the startup routine instructions may be stored in nonvolatile memory, such as an electrically erasable programmable read-only memory (EEPROM) chip. More specifically, the startup routine may be used to initialize the computing system by identifying, initializing, and/or testing connected components (e.g., devices). Additionally, the startup routine may be used to test and/or load instructions used to initialize the computing system, such as a boot loader used to load an operating system. For example, the startup routine may instruct the computing system to perform a cryptographic hash on code that will be subsequently executed and to determine whether the code has been undesirably modified (e.g., malicious, defective, or otherwise corrupted) based on the result of the cryptographic hash. In other words, the startup routine may be used to test subsequently executed instructions for possible corruption to improve the operational reliability of the computing system.

To further improve the operational reliability of the computing system, the startup routine instructions may also be tested for possible corruption before execution. More specifically, similar to the subsequently executed instructions, the startup routine instructions may be identified and a malware error-detection may be performed. However, unlike the subsequently executed instructions, the startup routine instructions may not be used to identify itself because the startup routine instructions are tested before they are executed.

Accordingly, it would be beneficial to improve operational reliability of a computing system, for example, by enabling startup routine instructions to be identified for testing before execution.

DETAILED DESCRIPTION OF SPECIFIC EMBODIMENTS

As described above, to improve reliability of a computing system, instructions may be tested before execution to detect possible corruption. In accordance with embodiments described herein, when a computing system is powered on, the computing system may execute startup routine (e.g., basic input/output system (BIOS)) instructions stored in a nonvolatile memory device (e.g., a boot device), which performs a corruption detection test on subsequently executed instructions, such as boot loader instructions. More specifically, the startup routine instructions may provide the location of an instruction to be executed and the operation used to test the instruction. For example, using the startup routine instructions, the computing system may retrieve boot loader instructions from a particular address in memory and perform a cryptographic hash on the boot loader instructions. The result of the cryptographic hash may then be compared with an expected result. When the result of the cryptographic hash matches the expected result, the computing system may conclude with reasonable certainty that the instructions have not been corrupted and are safe to execute.

Since the startup routine instructions provide the basis for initializing the computing system, the startup routine instructions may also be tested to detect possible corruption before execution. One example of such a technique is described in U.S. patent application Ser. No. 13/937,887 entitled "Self-Measuring Nonvolatile Memory Devices with Remediation Capabilities and Associated Systems and methods," filed by Lance W. Dover on Jul. 9, 2013, which is hereby incorporated into the present disclosure by reference.

However, the startup routine instructions are generally the first instructions executed to initialize the computing system. Nevertheless, it would be beneficial to test the startup routine instructions before executing any portion of the startup routine instructions. In other words, it would be beneficial to test the startup routine instructions without using the startup routine instructions to test itself.

Accordingly, in some embodiments, the nonvolatile boot device may include control logic (e.g., a state machine or microcontroller that executes microcode) to test the startup routine instructions. More specifically, when microcode is used, it may provide the operation used to test the startup routine instructions. For example, using the microcode, the microcontroller may perform a cryptographic hash on the startup routine instructions and compare the result of the cryptographic hash with an expected result. When the result of the cryptographic hash matches the expected result, the microcontroller may determine with reasonable certainty that the startup routine instructions have not been corrupted and are safe to be executed by the computing system.

To reduce the possibility of the microcode being corrupted, the microcode may be programmed in a low level language, such as machine code. Additionally, the microcode may be stored in un-modifiable read-only memory, for example, using resistors and fuse devices (e.g., anti-fuse devices). In this manner, the possibility of corruption may be reduced by making the microcode not readily accessible and generally difficult to modify (e.g., reprogram).

However, this may make it undesirable to directly provide the location of the startup routine instructions in the microcode. More specifically, statically storing the location of the startup routine instructions may limit the flexibility of subsequent updates to the startup routine instructions. For example, a user of the computing system may update the startup routine instructions to fix a bug or to provide additional functionality (e.g., to the corruption detection test). In some embodiments, updates to the startup routine instructions may change the memory addresses at which the startup routine instructions are stored. For example, before an update, the startup routine instructions may be stored in a contiguous block of memory addresses (e.g., a block of ten memory addresses). However, after the update, the startup routine instructions may be stored in separate non-contiguous blocks (e.g., three separate blocks each with five memory addresses). As such, statically storing the location may make it difficult to adapt the testing of the startup routine instructions to account for such an update.

Accordingly, as will be described in more detail below, embodiments of the present disclosure enable testing of startup routine instructions even after an update, which may change the location and/or size of the startup routine instructions stored in nonvolatile memory of a boot device. For example, some embodiments utilize list of pointers. More specifically, each pointer may identify at least a portion of the startup routine instructions by including an address parameter, which provides a starting memory address of the portion, and a size parameter, which provides the number of memory addresses included in the portion. Thus, the startup routine instructions may be identified by traversing the list of pointers and identifying (e.g., linking) the various portions of the startup routine instructions. Subsequently, the startup routine instructions may be tested for possible corruption, for example as a whole or portion by portion. In this manner, the startup routine instructions may be tested before execution.

Additionally, as will be described in more detail below, embodiments of the present disclosure enable the pointers to be updated to account for changes in the startup routine instruction size and locations. In other words, when a user of the computing system updates the startup routine instructions, the pointers may be updated to facilitate identifying where to find the startup routine instructions. In fact, to improve the operational reliability of the computing system, the pointers may be securely updated. More specifically, some embodiments restrict updating the pointers to authorized parties. For example, instructions to update the pointers may be signed and verified using a cryptographic key. As such, based on the signature, it may be determined whether a pointer update instruction came from an authorized party.

Furthermore, as will be described in more detail below, some embodiments may mitigate the risk of faults that can potentially occur while the pointers are being updated, such as a power loss or a faulty write. More specifically, some embodiments may mitigate the risk by updating the pointers atomically. For example, the pointer update process may be initialized with a "Start Pointer Update" instruction and ended with a "Finish Pointer Update" instruction, after which the pointer updates may be finalized. In this manner, the updates to the pointers may be verified before finalizing the updates. Additionally, when a fault occurs, the pointers may simply be restored to a pre-updated version. Moreover, any number of instructions (e.g., steps) may be taken to update the pointers, which may provide flexibility with various implementations of the startup routine instructions.

Figure 1:
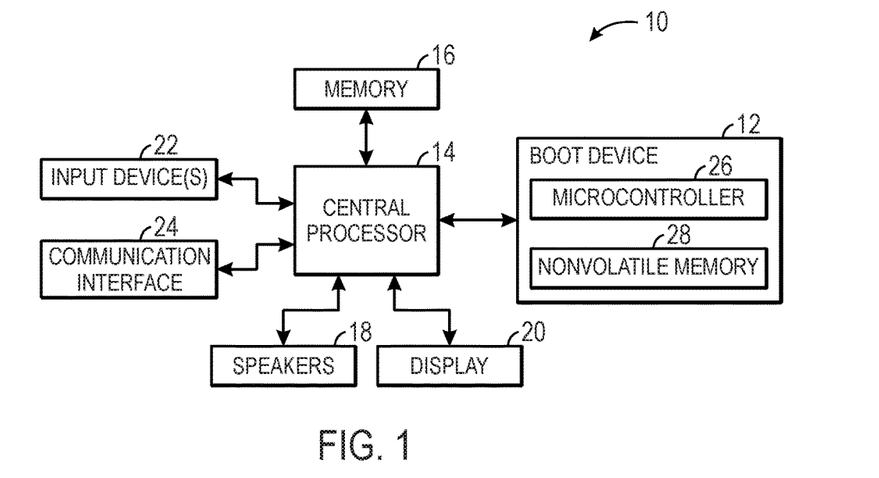
FIG. 1 illustrates a block diagram of a computing system, in accordance with an embodiment.

As such, the techniques described herein may enable testing of dynamic startup routine instructions stored in a nonvolatile boot device using pointers to identify the startup routine instructions. To help illustrate, an embodiment of a computing system 10 with a nonvolatile boot device 12 is described in FIG. 1. The computing system 10 may be any of a variety of types such as a computer, pager, cellular phone, personal organizer, control circuit, etc. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in computing system 10.

As depicted, the computing system 10 includes a central processor 14 and memory 16. More specifically, the central processor 14 may execute instructions stored in memory 16 to perform various operations in the presently described techniques. As such, the central processor 14 may include one or more general purpose microprocessors, one or more application specific processors (ASICs), one or more field programmable logic arrays (FPGAs), or any combination thereof. Additionally, the memory 16 may be a tangible, non-transitory, computer-readable medium that stores instructions executable by the central processor 14 and/or data processed by the central processor 14. In some embodiments, the memory 16 may include volatile memory, such as random access memory (RAM), and/or non-volatile memory, such as read only memory (ROM), flash memory, ferroelectric RAM (F-RAM), hard disks, floppy disks, magnetic tape, optical discs, or any combination thereof. As such, in some embodiments, the memory 16 (e.g., non-volatile memory) may be part of the boot device 12.

Additionally, the central processor 14 may utilize the other components in the computing system 10 to perform various functions. One function may include the communication of information with a user, which may include providing information to a user and receiving control commands from the user. For example, the central processor 14 may provide audio data to the speakers 18 and instruct the speakers 18 to communicate the audio data to a user as sound. Additionally, the central processor 14 may provide video data to the display 20 and instruct the display 20 to display a graphical user interface that presents information to the user. Furthermore, to facilitate receiving information, the central processor 14 may receive control commands from a user via one or more input devices 22. In some embodiments, the input device 22 may include buttons, switches, a keyboard, a light pen, a mouse, a digitizer and stylus, a voice recognition system, a touch sensitive display, or any combination thereof.

Additionally, information may be communicated with external devices via the communication interface 24. More specifically, the communication interface 24 may enable the computing system 10 to connect to a network, such as a personal area network (e.g., a Bluetooth network), a local area network (e.g., 802.11x Wi-Fi network), and/or a wide area network (e.g., a 3G cellular network). Additionally, the communication interface 24 may enable the computing system 10 to connect directly to external devices, for example, via serial cables.

To initialize the above-described functions as well as others, startup routine instructions stored in the boot device 12 may be executed. As depicted, the boot device 12 includes a microcontroller 26 (e.g., control logic) and nonvolatile memory 28, which stores the startup routine instructions. In some embodiments, the nonvolatile memory 28 may be a bootable flash media, such as a NOR or NAND flash.

Upon powering on the computing system 10, the startup routine instructions may be retrieved from the nonvolatile memory 28 so that the central processor 14 may execute the instructions to initialize the computing system 10. More specifically, as described above, the startup routine may establish the foundation for desired operation of the computing system 10, for example, by instructing the central processor 14 to perform corruption detection on instructions (e.g., code) stored in memory 16 to detect the presence of malicious, defective, or otherwise corrupted instructions.

However, even before the computing system 10 is initialized, the startup routine instructions may be tested to detect the presence of malicious, defective, or otherwise corrupted instructions. More specifically, to facilitate testing, the microcontroller 26 may identify the startup routine instructions in the nonvolatile memory 28, for example, using one or more pointers. Once identified, the microcontroller 26 may perform a testing operation on the startup routine instructions, for example, by performing a cryptographic hash on the startup routine instructions.

Figure 2:
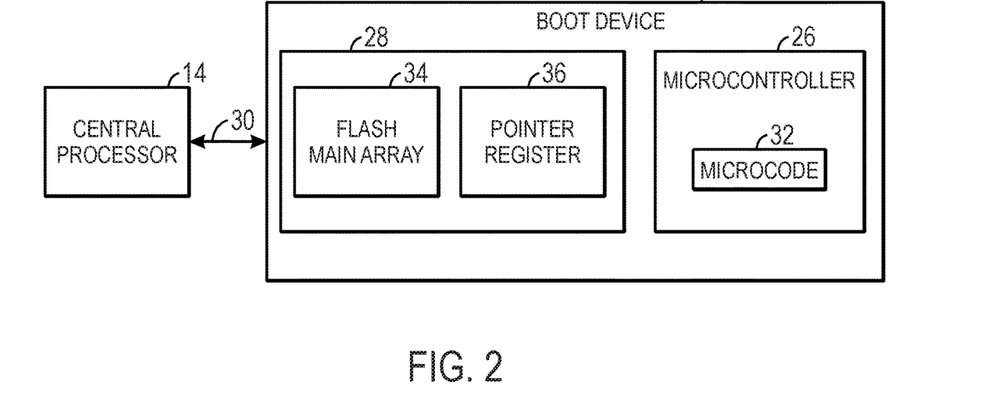
FIG. 2 illustrates a block diagram of a central processor and a boot device included in the computing system of FIG. 1, in accordance with an embodiment.

To help illustrate, a more detailed view of the boot device 12 and the central processor 14 are described in FIG. 2. As depicted, the central processor 14 and the nonvolatile boot device 12 are communicatively coupled, for example, via a data bus 30. In this manner, the central processor 14 and the nonvolatile boot device 12 may communicate information/data. For example, upon powering on, the central processor 14 may transmit a control command to the boot device 12 instructing the boot device 12 to test the startup routine instructions. In other embodiments, the boot device 12 may automatically initiate the testing of the startup routine instructions based on a preconfigured state, such as being initially powered on. Additionally, the nonvolatile boot device 12 may transmit tested (e.g., verified) startup routine instructions to the central processor 14 for execution.

As described above, the microcontroller 26 may test the startup routine instructions stored in the nonvolatile memory 28 by executing microcode 32. More specifically, the microcode 32 may instruct the microcontroller 26 to identify the startup routine instructions and perform a testing operation, such as a cryptographic hash operation, on the startup routine instructions. Generally, microcode 32 may be statically (e.g., un-modifiably programmed), for example using resistors and fuse devices (e.g., anti-fuse devices).

Accordingly, to enable the use of dynamic (e.g., updatable) startup routine instructions in the computing system 10, one or more pointers may be used to facilitate identifying the startup routine instructions. More specifically, each pointer may identify where at least a portion of the startup routine instructions is stored in the nonvolatile memory 28.

In the depicted embodiment, the nonvolatile memory 28 includes parallel address spaces, which includes a flash main array 34 and a pointer register 36. More specifically, the flash main array 34 may store the startup routine instructions and be externally accessible, for example to enable the central processor 14 to retrieve the startup routine instructions. On the other hand, the pointer register 36 may store a list of pointers and be an internal resource, for example, only accessible by the microcontroller 26. In other embodiments, the pointer register 36 may be included as a restricted portion of the flash main array 34.

Thus, to test the startup routine instructions, the microcode 32 may instruct the microcontroller 26 to locate a portion of the startup routine instructions stored in the flash main array 34 using the pointers stored in the pointer register 36. The microcode 32 may then instruct the microcontroller 26 to test the identified startup routine instructions. To help illustrate, a block diagram of the testing process is described in FIG. 3, which includes the pointer register 36 and the flash main array 34.

Figure 3:
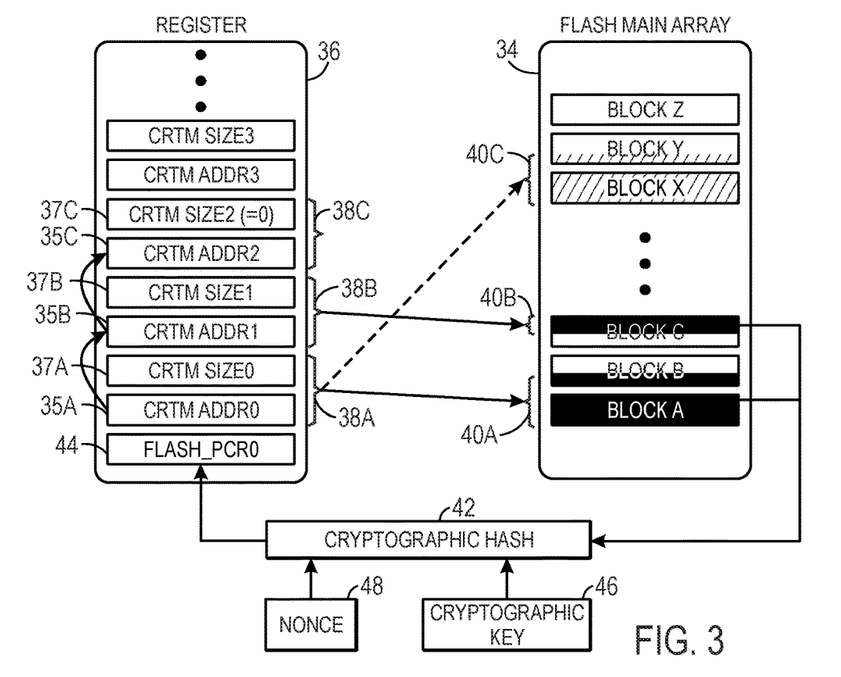
FIG. 3 illustrates a data flow within the boot device of FIG. 2 when testing startup routine instructions, in accordance with an embodiment.

As depicted, the pointer register 36 includes a plurality of pointers 38, which each includes an address parameter 35 and a size parameter 37. As described above, each pointer 38 may be used to identify at least a portion of the startup routine instructions. Accordingly, the address parameter 35 may provide the first memory address in the flash main array 34 at which the portion of the startup routine instructions is stored. Additionally, the size parameter 37 may provide the size (e.g., number of memory addresses) of the portion of the startup routine instructions.

For example, in the depicted embodiment, the first pointer 38A identifies a first portion of the startup routine instructions 40A. More specifically, the first address parameter (e.g., CRTM_Addr0) 35A may indicate that the first portion 40A starts at a memory address at the beginning of Block A and the first size parameter (e.g., CRTM_Size0) 37A may indicate that the first portion 40A spans from the memory address at the beginning of Block A to a memory address in the middle of Block B. Additionally, the second pointer 38B identifies a second portion of the startup routine instructions 40B. More specifically, the second address parameter (e.g., CRTM_Addr1) 35B may indicate that the second portion 40B starts at a memory address in the middle of Block C and the second size parameter (e.g., CRTM_Size1) 37B may indicate that the second portion 40B spans from the memory address in the middle of Block C to a memory address at the end of Block C.

Thus, as in the depicted example, the startup routine instructions may be stored in any number of noncontiguous memory addresses in the flash main array 34. Accordingly, the pointers 38 may be stored as a list in the pointer register 36 to facilitate linking together each of the noncontiguous memory addresses. In some embodiments, the microcode 32 may statically indicate the location of the pointers 38. Thus, portions of the startup routine instructions may be linked together by traversing the list of pointers 38. More specifically, a portion of the startup routine instructions identified by a pointer 38 may be linked with other identified portions of the startup routine instructions using the other pointers 38 in the list. For example, in the depicted embodiment, the first portion of the startup routine instructions 40A, which is identified by the first pointer 38A, may be linked with the second portion of the startup routine instructions 40B, which is identified by the second pointer 38B, and so on until an indication that all portions of the startup routine instructions have been identified and linked. For example, in the depicted embodiment, the third pointer 38C may indicate that all portions have been identified since the third size parameter (e.g., CRTM_Size2) is set to "0."

In this manner, the startup routine instructions may be identified by traversing the list of pointers and linking the identified portions of the startup routine instructions. For example, in the depicted embodiment, the startup routine instructions may be identified once the memory addresses at which the first portion 40A and the second portion 40B are stored are identified. Thus, even when stored as non-contiguous portions (e.g., 40A and 40B), the pointers (e.g., 38A and 38B) enable the startup routine instructions to be linked and executed (e.g., tested).

Once identified, the startup routine instructions may be tested for possible corruption. In some embodiments, the startup routine instructions may then be tested by inputting the startup routine instructions into a cryptographic hash function 42, such as SHA-256. More specifically, the cryptographic hash function 42 may map an input of any size to a fixed size output (e.g., 256 bits) and may be repeatable. In other words, the same input should map to the same fixed size output. However, even a small change to the input may map to a completely different output. In the depicted embodiment, the determined result of the cryptographic hash function 42 may be stored in a result register 44 (e.g., Flash_PCR0) in the pointer register 36. In some embodiments, only a trusted party may be allowed to store a determined result in the result register 44.

Accordingly, the startup routine instructions may be tested by comparing the result stored in result register 44 to an expected result (e.g., a "golden value"). More specifically, the expected result may be the result of the cryptographic hash function 42 when an uncorrupted version of the startup routine instructions is input. As such, when the result of the cryptographic hash function 42 matches the expected result, it may be determined with reasonable certainty that the startup routine instructions are uncorrupted. In some embodiments, the expected result may be stored in the pointer register. Additionally, as will be described in more detail below, when the startup routine is updated, the expected result may also be updated.

In some embodiments, when corruption test results are communicated to the central processor 14, a cryptographic key 46 and/or a nonce 48 may be used in the cryptographic hash function 42 to sign the output. More specifically, the cryptographic key 46 may be used to verify identify of the boot device 12 and the nonce 48 may be a random or pseudo-random number used to provide originality. In other words, the cryptographic key 46 may be used to verify that the boot device 12 determined (e.g., calculated) the result and the nonce 48 may be used to verify that the result is presently determined and not merely a repeated previously determined result.

As illustrated in the above example, the pointers 38 may enable the microcontroller 26 to test the startup routine instructions for possible corruption before execution. One embodiment of a process 50 for testing the startup routine instructions is described in FIG. 4. Generally, the process 50 includes reading a pointer (process block 52) and determining whether the pointer is the last pointer in a list of pointers (decision block 54). When the pointer is not the last pointer in the list of pointers, the process 50 includes identifying at least a portion of the startup routine instructions (process block 56), testing the at least a portion of the startup routine instructions (process block 58), determining when a corruption is detected (decision block 60), and stopping when a corruption is detected (process block 61). On the other hand, when the pointer is the last pointer in the list, the process 50 includes transmitting the startup routine instructions to a central processor (process block 62). In some embodiments, process 50 may be implemented by instructions stored in one or more tangible, non-transitory, computer-readable medium, such as nonvolatile memory 28, and executed by one or more processing components, such as microcontroller 26.

Figure 4:
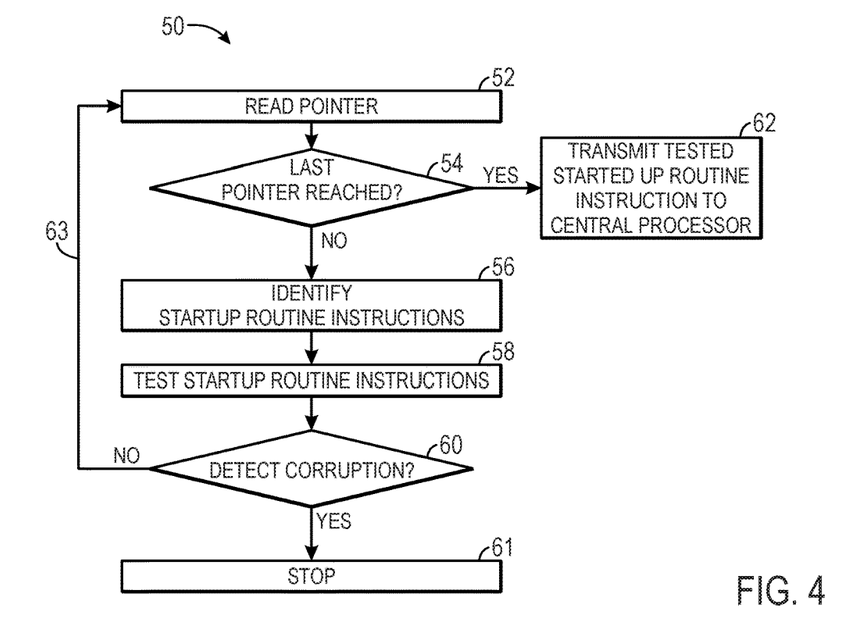
FIG. 4 illustrates a process flow for testing the startup routine instructions, in accordance with an embodiment.

Accordingly, the microcontroller 26 may read one or more pointers 38 (process block 52) to identify the startup routine instructions. In some embodiments, a pointer 38 may include an address parameter and a size parameter. More specifically, the address parameter may indicate a memory address in the flash main array 34. Additionally, the size parameter may indicate a number of memory addresses or that the startup routine instructions have been completely identified.

Thus, upon reading the pointer 38, the microcontroller 26 may determine whether the startup routine instructions have been completely identified based on whether the pointer 38 is the last pointer in the list of pointers (decision block 54). In some embodiments, the pointer 38 may indicate that the startup routine instructions have been completely identified when the size parameter is set to "0." Accordingly, the microcontroller 26 may determine whether the pointer 38 is the last pointer in the list of pointers by determining whether the size parameter of the pointer 38 is equal to zero.

When the microcontroller 26 determines that the startup routine instructions have not been completely identified, the microcontroller 26 may read the pointer 38 to identify at least a portion of the startup routine instructions (process block 56). More specifically, the microcontroller 26 may read the address parameter of the pointer 38 to determine the first memory address in the flash main array 34 at which the portion of the startup routine instructions is stored. Additionally, the microcontroller 26 may read the size parameter of the pointer 38 to determine the number of memory addresses following the first memory address the portion of the startup routine instructions spans. As such, the microcontroller 26 may identify the memory addresses in the flash main array 34 where the portion of the startup routine instructions is stored.

Once at least a portion of the startup routine instructions is identified, the microcontroller 26 may test the startup routine instructions for possible corruption (process block 58). More specifically, in some embodiments, the microcontroller 26 may read the startup routine instructions from the determined memory addresses in the flash main array 34 and perform a cryptographic hash on the startup routine instructions. The result may then be compared with an expected result. In this manner, the startup routine instructions read from the flash main array 34 may be compared with an uncorrupted (e.g., trusted) version of the startup routine instructions.

As such, the microcontroller 26 may determine that the read startup routine instructions differ from the uncorrupted version in some way when the determined (e.g., calculated) result does not match the expected result (decision block 60). In other words, the microcontroller 26 may determine that the read startup routine instructions may be potentially corrupted. As such, the microcontroller 26 may stop identifying the startup routine instructions and deny access to the startup routine instructions (process block 61). In some embodiments, an alert may be communicated to a user to the potential corruption.

On the other hand, when the determined result matches the expected result, the microcontroller 26 may determine with reasonable certainty that the read startup routine instructions may be trusted. As such, microcontroller 26 may traverse the list of pointers to a next pointer 38 (arrow 63). In this manner, the microcontroller 26 may identify and link the memory addresses at which the startup routine instructions are stored until the microcontroller 26 determines that the startup routine instructions have been fully identified (decision block 54). And when the fully identified, the microcontroller 26 may transmit the startup routine instructions to the central processor 14 (process block 62). In some embodiments, the microcontroller 26 may transmit the startup routine instructions to the central processor 14 via the data bus 30. In other words, the microcontroller 26 may grant the central processor 14 access to the startup routine instructions. The central processor 14 may then execute the startup routine instructions to initialize the rest of the computing system 10.

In this manner, the pointers 38 may facilitate testing the startup routine instructions for possible corruption before execution. As described above, over the lifetime of the computing system 10, the startup routine instructions may be updated, for example, to fix a bug or add functionality. However, when the startup routine instructions are updated, the memory addresses used to store the startup routine instructions may change. For example, the number of memory addresses used (e.g., size of portions) and the distribution of memory addresses used (e.g., number of portions) may change.

To help illustrate, returning to FIG. 3, the startup routine instructions may be updated such that the startup routine instructions no longer include the first portion 40A and instead include the second portion 40B and a third portion 40C. Thus, to facilitate identifying the startup routine instructions, the first pointer 38A may be updated to identify the third portion 40C instead of the first portion 40A. More specifically, the first address parameter 35A may be updated to indicate that the third portion 40C starts at a memory address at the beginning of Block X and the first size parameter 37A may be updated to indicate that the third portion 40C spans from the memory address at the beginning of Block X to a memory address in the middle of Block Y.

In this manner, the use of pointers 38 enables the startup routine instructions to be tested even when updated. More specifically, the pointers 38 may be correspondingly updated to identify the portions of the updated startup routine instructions. However, since the pointer 38 may be used to identify the startup routines instructions, which are executed to initialize the computing system 10, it may be beneficial to improve reliability of the pointer updates. More specifically, this may include restricting the ability to update pointers 38 to authorized parties. Additionally, this may include protecting against the risk of faults that occur while updating the pointers, such as power loss or writing errors.

Figure 5:
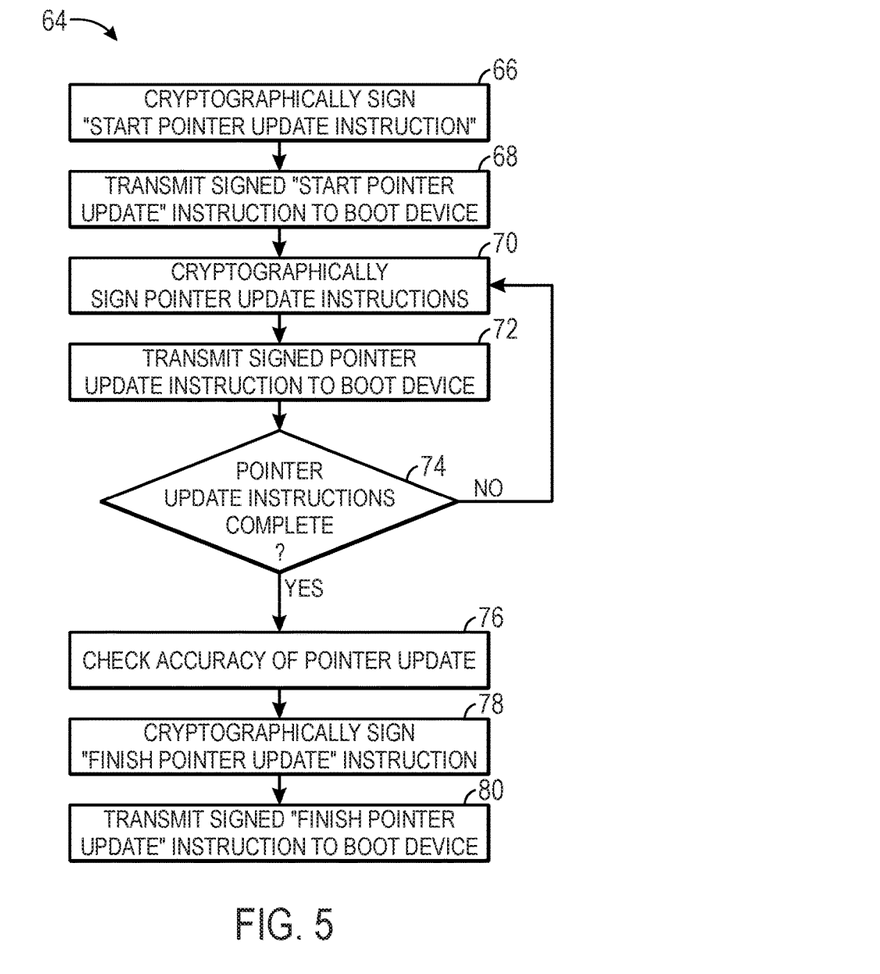
FIG. 5 illustrates a process flow for instructing the boot device of FIG. 2 to update startup instruction pointers, in accordance with an embodiment.

To help illustrate, an embodiment of a process 64 used by a host system (e.g., central processor 14) to instruct the boot device 12 to update pointers 38 is described in FIG. 5. Generally, process 64 includes cryptographically signing a "Start Pointer Update" instruction (process block 66), transmitting the signed "Start Pointer Update" instruction to a boot device (process block 68), cryptographically signing a pointer update instruction (process block 70), transmitting the signed pointer update instruction to the boot device (process block 72), and determining whether the pointer update instructions are complete (decision block 74). When complete, the process 64 includes checking the accuracy of the pointer update (process block 76), cryptographically signing a "Finish Pointer Update" instruction (process block 78), and transmitting the signed "Finish Pointer Update" instruction to the boot device (process block 80). In some embodiments, a nonce or monotonic count value may be included with the signatures to reduce the possibility of a replay intrusion. Additionally, in some embodiments, process 64 may be implemented with instructions stored on one more tangible, non-transitory, computer readable medium, such as memory 16, and executed by one or more processing component, such as central processor 14.

As described above, updating the pointer 38 may be restricted to authorized parties. In the presently described embodiment, the identity of the updating party may be verified by signing each instruction transmitted to the boot device 12. More specifically, each authorized party may know a cryptographic key, such as a symmetric or asymmetric key. Accordingly, the central processor 14 may generate a signature by performing a cryptographic hash on each instruction using the cryptographic key. For example, the central processor 14 may use the cryptographic key to sign the "Start Pointer Update" instruction (process block 66), each pointer update instruction (process block 70), and the "Finish Pointer Update" instruction (process block 78).

The central processor 14 may then transmit each instruction with the signature to the boot device 12. For example, the central processor 14 may transmit the "Start Pointer Update" instruction along with a signature (process block 68), each pointer update instruction with a signature (process block 72), and the "Finish Pointer Update" instruction with a signature (process block 80) to the boot device 12 via the data bus 30.

As will be described in more detail below, the boot device 12 may then determine whether the central processor 14 is an authorized party based at least in part on the signature. In this manner, the risk of unauthorized parties undesirably adjusting the pointers 38 may be reduced. As such, even though the pointers 38 are not statically programmed like the microcode 32, the pointer 38 may still be acceptably reliable.

Additionally, as described above, the process used to update the pointer 38 may protect against the risk of faults occurring during the updating process. In the presently described embodiment, such risks may be mitigated by atomically updating the pointers 38. More specifically, the central processor 14 may use the "Start Pointer Update" instruction to initialize the updating process and the "Finish Pointer Update" instruction to end the updating process. Between the "Start Pointer Update" instruction and the "Finish Pointer Update" instruction, the central processor 14 may transmit any number of pointer update instructions to the boot device 12, which instruct the boot device 12 to update the pointers.

In this manner, risks of update disruption may be mitigated because, as will be described in more detail below, the updates to the pointers 38 are not finalized until the "Finish Pointer Update" instruction is received. For example, in the scenario of a power loss during the middle of a pointer update, any changes to the pointers may be discarded and the boot device 12 may revert back to its previous (e.g., un-updated) pointers. As such, it may be clear the status of the pointers without having to determine exactly how far the update process was before the power loss.

Additionally, since any number of pointer update instructions may be used, flexibility in updating the pointers 38 may be improved. More specifically, this may enable a varying number of pointers 38 to be used and/or updated. For example, the pointer update process may update a single pointer 38 or update five pointers 38. However, the number of instructions used to update the single pointer 38 may different from the number of instructions used to update the five pointers 38.

Thus, since any number of pointer update instructions may be used, atomically updating the pointers 38 may provide flexibility in the implementation of the startup routine instructions (e.g., where and how the startup routine instructions are stored in the flash main array 34). More specifically, since the number of pointers 38 used to identify the startup routine instructions may be adjustable, the startup routine instructions may be stored in varying portions of the flash main array 34. For example, the central processor 14 may update the pointer register 36 so that one pointer 38 is used to identify the startup routine instructions in a contiguous block of memory addresses. On the other hand, the central processor 14 may update the pointer register 36 so that any number of pointers 38 (e.g., five pointers) are used to identify the startup routine instructions, which is stored in five separate non-contiguous portions of the flash main array 34 (e.g., five non-contiguous block of memory addresses).

Furthermore, atomically updating the pointers 38 may improve reliability of the pointers by enabling the central processor 14 to verify the accuracy of the updated pointers 38 before the pointers 38 are finalized (process block 76). More specifically, the central processor 14 may verify the accuracy of the updated pointers 38 before transmitting the "Finish Pointer Update" instruction. As such, if there is an error in the updated pointers 38, the pointers 38 may simply be restored to the pre-updated version because the updates have not been finalized. In this manner, an update may be subsequently performed on an non-erroneous version (e.g., pre-update version) of the pointers 38.

In some embodiments, the central processor 14 may verify the accuracy of the updated pointers 38 by instructing the boot device 12 to test the startup routine instructions using the updated pointers. More specifically, the central processor 14 may transmit an expected result of the cryptographic hash 42 when an uncorrupted version of the startup routine instructions is input. As such, if the boot device 12 determines that the result of the cryptographic hash 42 does not match the expected result, the central processor 14 may determine that the startup routine instructions are not likely corrupted because they have just been updated. Instead, the central processor 14 may determine that it is likely that the pointers 38 are inaccurate and restore to the pre-updated version. On the other hand, if the boot device 12 determines that the result matches the expected result, the central processor 14 may determine that the pointers 38 are accurate and transmit the "Finish Pointer Update" instruction to finalize the pointers 38 and instruct the boot device 12 to store the expected result, for example, in the pointer register 36.

Figure 6:
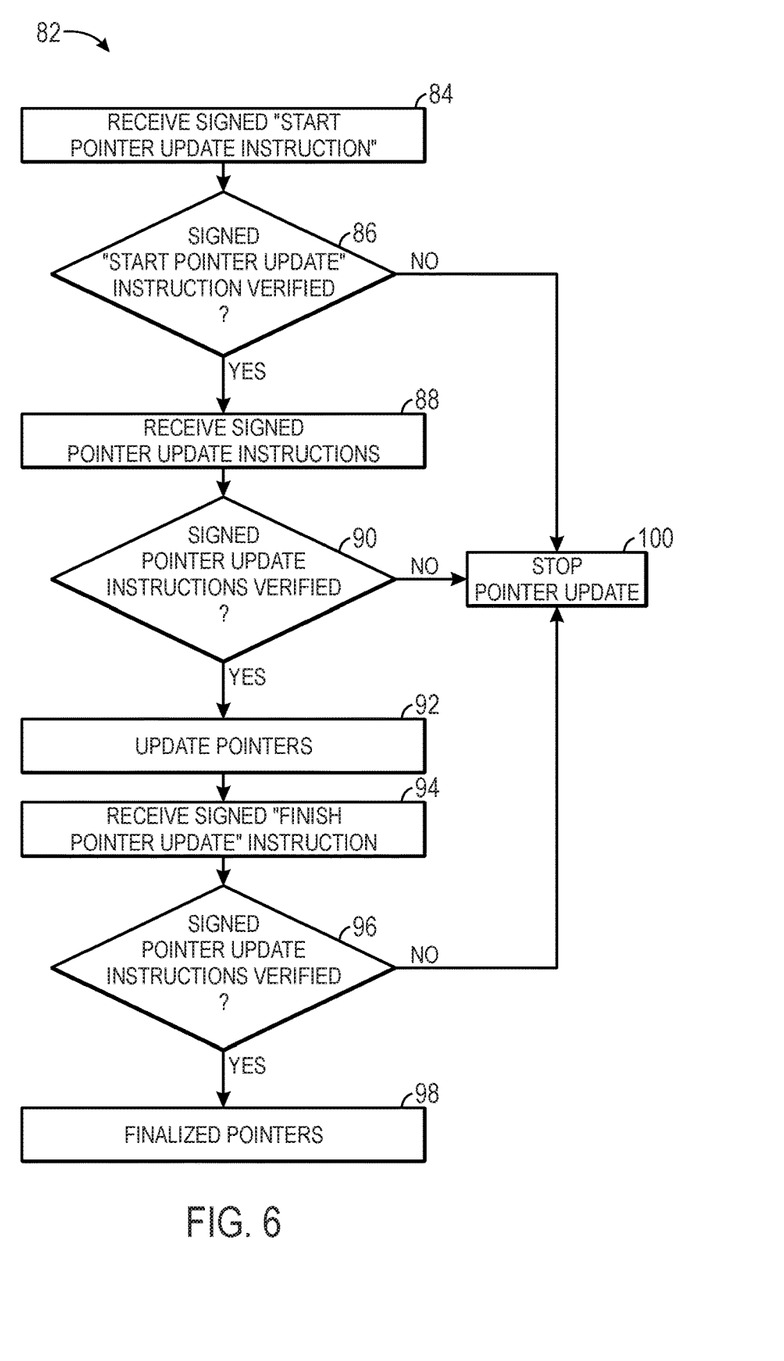
FIG. 6 illustrates a process flow for updating the startup instruction pointers, in accordance with an embodiment.

To further illustrate the pointer update process, one embodiment of a process 82 used by the boot device 12 to update the pointers 38 is described in FIG. 6. Generally, the process 82 includes receiving a signed "Start Pointer Update" instruction (process block 84), verifying the signed "Start Pointer Update" instruction (decision block 86), receiving signed pointer update instructions (process block 88), verifying the pointer update instructions (decision block 90), updating the pointers (process block 92), receiving a signed "Finish Pointer Update" instruction (process block 94), verifying the signed "Finish Pointer Update" instruction (decision block 96), and finalizing the pointers (process block 98). Additionally, if the "Start Pointer Update" instruction, any of the pointer update instructions, or the "Finish Pointer Update" instruction are unable to be verified, the process 82 includes stopping the pointer update (process block 100). In some embodiments, process 82 may be implemented with instructions stored on one or more tangible, non-transitory, computer-readable medium, such as nonvolatile memory 28, and executed by one or more processing components, such as microcontroller 26.

Accordingly, the microcontroller 26 may receive the signed "Start Pointer Update" instruction (process block 84), the signed pointer update instructions (process block 88), and the signed "Finish Pointer Update" instruction (process block 94) from the central processor 14, for example, via the data bus 30. However, before executing any of the received instructions, the microcontroller 26 may verify the signature received along with the instruction.

More specifically, the microcontroller 26 may perform the same operation as used to generate the signature. For example, the microcontroller 26 may perform a cryptographic hash on the instructions using a cryptographic key. The microcontroller 26 may then compare the result of the cryptographic hash with the received signature. When they match, the microcontroller 26 may verify that the instruction is received from an authorized party, and thus, execute the instruction.

For example, when the microcontroller 26 verifies the "Start Pointer Update" instruction (decision block 86), the microcontroller 26 may initiate the pointer update process. Once initiated, the microcontroller 26 may begin to receive the signed pointer update instructions. Additionally, when the microcontroller 26 verifies each pointer update instruction (decision block 90), the microcontroller 26 may execute the instruction to update the pointers 38 (process block 92). The microcontroller 26 may then receive the signed "Finish Pointer Update" instruction. When the microcontroller 26 verifies the "Finish Pointer Update" instruction (decision block 96), the microcontroller 26 may finalize the pointer updates (process block 98).

However, if any of the instructions are not able to be verified, the microcontroller 26 may stop the pointer update process (process block 100). More specifically, this may indicate that the party sending the instructions (e.g., central processor 14) may not be an authorized party or another party is attempting to undesirably adjust the pointers 38. As such, the microcontroller 26 may stop the update process and restore the pointers back to a pre-update version.

As such, startup routine instructions may be tested before execution regardless of how they are stored. More specifically, pointer 38 may be used to identify the location of where portions of the startup routine instructions are stored. Moreover, the pointers 38 may be updated to account for updates to the startup routine instructions, which may change how/where the startup routine instructions are stored. Additionally, in some embodiments, the update of the pointers 38 may be secured by restricting the ability to update the pointers 38 to authorized parties and mitigating risk of faults that may occurring during updating. Thus, the technical effect of the present disclosure includes improving reliability of a computing system by enabling testing of dynamic startup routine instructions, which are used to initialize the computing system, for possible corruption before execution.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

What is claimed is:

1. A tangible, non-transitory, computer-readable medium that stores instructions executable by one or more processors of a computing system, wherein the instructions comprise instructions to:

update, using the one or more processors, startup routine instructions stored in nonvolatile memory of a boot device;

determine, using the one or more processors, a first pointer update instruction that instructs the boot device to update a first pointer to identify at least a first portion of the startup routine instructions in the nonvolatile memory after the startup routine instructions are updated;

determine, using the one or more processors, a first signature by performing a cryptographic hash on the first pointer update instruction; and communicate, using the one or more processors, the first signature along with the first pointer update instruction to the boot device to enable the boot device to update the first pointer only after the boot device verifies the first pointer update instruction based at least in part on the first signature.

2. The computer-readable medium of claim 1, wherein the instructions to update the startup routine instructions comprise instructions to:

fix a bug in the startup routine instructions;

adjust functionality provided by executing the startup routine instructions; or both.

3. The computer-readable medium of claim 1, wherein the instructions to determine the first pointer update instruction comprises instructions to:

determine a starting memory address in the nonvolatile memory where the first portion of the startup routine instructions is stored;

determine number of contiguous memory address in the nonvolatile memory used to store the first portion of the startup routine instructions; and determine the first pointer update instruction to instruct the boot device to:

adjust an address parameter of the first pointer based at least in part on the starting memory address;

adjust a size parameter of the first pointer based at least in part on the number of contiguous memory addresses; or both.

4. The computer-readable medium of claim 1, comprising instructions to:

determine, using the one or more processors, a second pointer update instruction that instructs the boot device to update a second pointer to identify a second portion of the startup routine instructions in the nonvolatile memory after the startup routine instructions are updated;

determine, using the one or more processors, a second signature by performing the cryptographic hash on the second pointer update instruction; and communicate, using the one or more processors, the second signature along with the second pointer update instruction to the boot device to enable the boot device to update the second pointer only after the boot device verifies the second pointer update instruction based at least in part on the second signature.

5. The computer-readable medium of claim 1, comprising instructions to:

determine, using the one or more processors, a start pointer update instruction that instructs the boot device to initialize pointer updating;

determine, using the one or more processors, a second signature by performing the cryptographic hash on the start pointer update instruction; and communicate, using the one or more processors, the second signature along with the start pointer update instruction to the boot device before the first pointer update instruction to enable the boot device to update the first pointer only after the boot device verifies the start pointer update instruction based at least in part on the second signature.

6. The computer-readable medium of claim 1, comprising instructions to:

determine, using the one or more processors, a finish pointer update instruction that instructs the boot device to finalize pointer updating;

determine, using the one or more processors, a second signature by performing the cryptographic hash on the finish pointer update instruction; and communicate, using the one or more processors, the second signature along with the finish pointer update instruction to the boot device after the first pointer update instruction to enable the boot device to restore the first pointer to a previous version when the boot device is unable to verify the finish pointer update based at least in part on the second signature.

* * * * *